Jan. 1, 1963      C. B. STRANDGREN      3,071,022
DRIVING SCREWS AND METHOD OF FABRICATING THE SAME
Filed Feb. 26, 1960      2 Sheets-Sheet 1
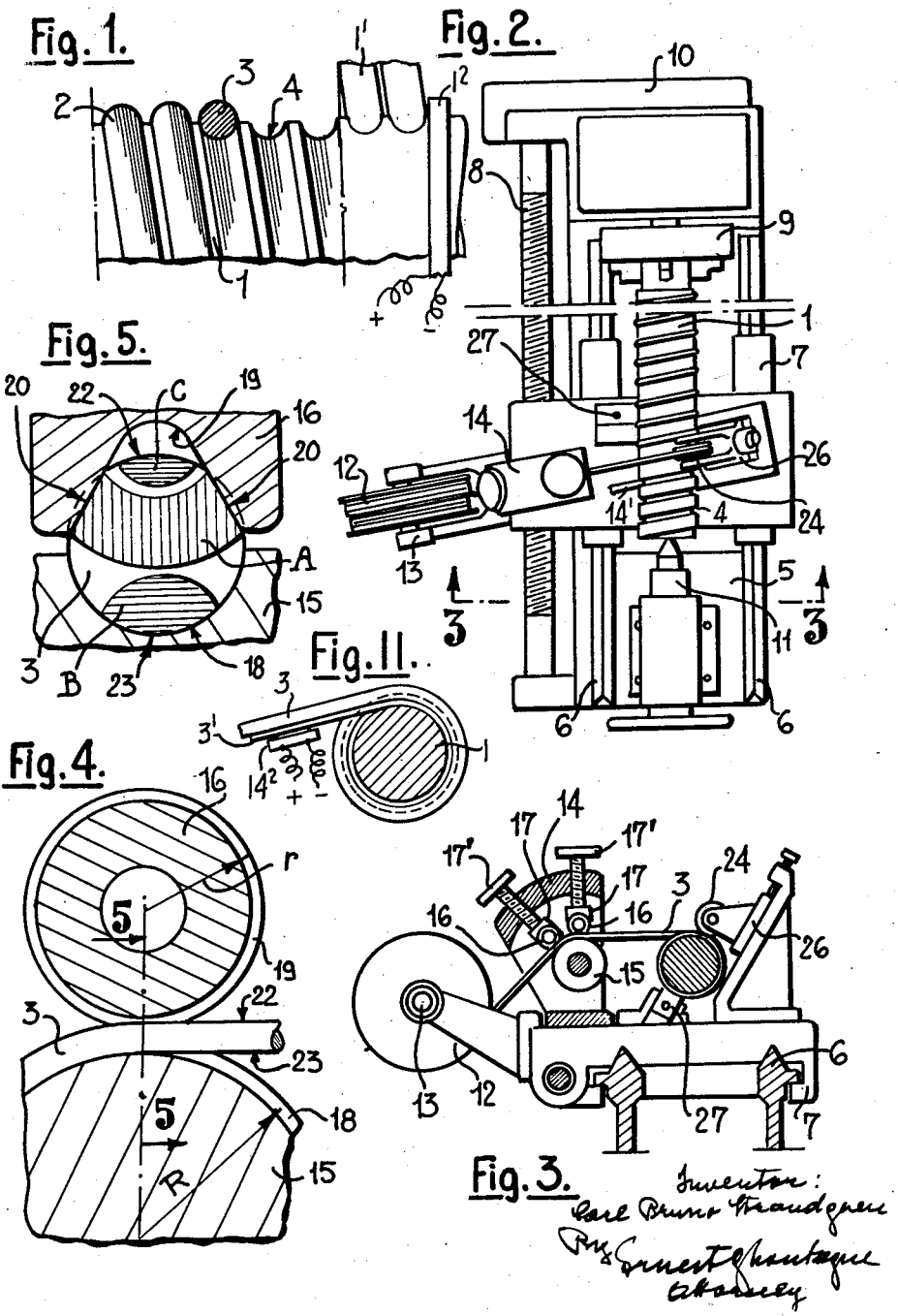

Jan. 1, 1963 C. B. STRANDGREN 3,071,022
DRIVING SCREWS AND METHOD OF FABRICATING THE SAME
Filed Feb. 26, 1960 2 Sheets-Sheet 2
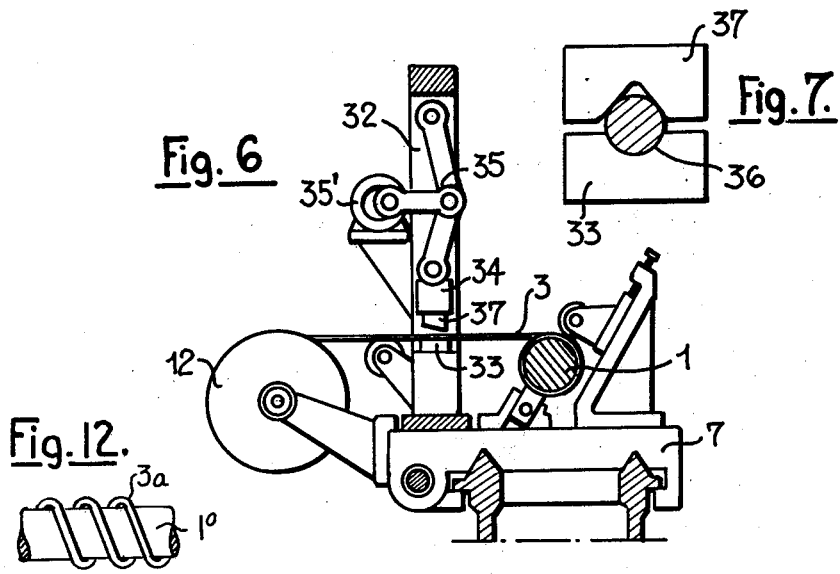
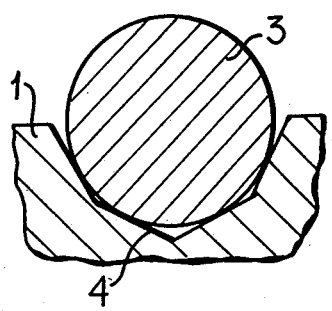
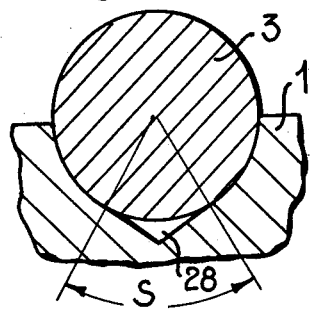
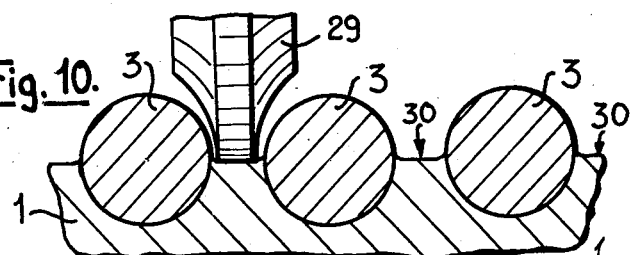

United States Patent Office 3,071,022
Patented Jan. 1, 1963

3,071,022
DRIVING SCREWS AND METHOD OF
FABRICATING THE SAME
Carl Bruno Strandgren, 8 Chemin de la Plaisante,
Lausanne, Switzerland
Filed Feb. 26, 1960, Ser. No. 11,312
Claims priority, application Switzerland Mar. 2, 1959
12 Claims. (Cl. 74—458)

The present invention relates to driving screws and a method of fabricating the same.

Screw driving devices are known which comprises a nut constituted by an internally threaded ring cooperating with a screw through the medium of a plurality of rollers which are likewise threaded and disposed as satellites between the screw and the ring. In these devices, which are described more especially in Swiss Patents No. 290,685 and No. 330,595, and which also describe the particular use and purpose of the driving screw of the present invention, the rollers are of a relatively small diameter and the threads of the screw must be able to take high point loads.

To obtain the desired strength, it is conventional to form these screws from alloyed quality steels having a high carbon content, which have to be subjected to complicated heat treatments. After these heat treatments are terminated, the screws also have to be straightened, requiring a long and complicated operation before the truing step of the threads is carried out. This operation has numerous difficulties in the case of long screws, which undergo deformation during working, especially with the thread profiles necessary on this kind of screw having multiple threads. These screws thus require a great weight of an expensive material and long and difficult manufacturing operations which are hence costly.

It is, therefore, one object of the present invention, to provide a method of making a screw which is produced at low costs, but the threads of which are at the same time to have high tenacity.

It is another object of the present invention to provide a process of producing a screw comprising a body and at least one attached thread constituted by a metal wire wound in the form of a helix thereon and disposed in a helical groove in this body. Before winding the wire in the form of a helix, it is subjected to a treatment which tends to elongate it in a more marked manner on the side which has to be situated on the outside of the helix than on the inner side thereof, so as to produce in the corresponding half of the cross-section of the wire compression stresses, which are sufficiently high for this part of the wire intended to project from the body of the screw, to remain, once the wire has been wound, the site of compression stresses having the effect of improving its tenacity.

In the composite screw obtained by this process it is possible to form just the threads of a quality steel and the compression of the part of the wire which projects can give a considerable tenacity to the threads.

In a preferred embodiment of the process of the present invention, the body of the screw between the threads is also subjected to rolling, in order to drive material of the body beneath the wire wound on the latter.

It is still another object of the present invention which comprises a screw obtained by this process, which has a body and at least one attached thread constituted by a metal wire disposed in a helical groove in this body, wherein the wire is subjected to compression stresses in the major part, at least of the part of its section which projects from the body of the screw.

With these and other objects in view which will become apparent in the following detailed description, the present invention will be clearly understood in connection with the acompanying drawings, in which:

FIGURE 1 is a partial view of the screw in which the wire forming the thread and shown partly in section is removed from a part of the screw, and a portion of the cylindrical body in which the helical groove is formed;

FIG. 2 is a diagrammatic plan view of the machine used to produce the screw;

FIG. 3 is a section along the lines 3—3 of FIG. 2;

FIG. 4 is a fragmentary sectional view of the machine on a larger scale;

FIG. 5 is a section along the lines 5—5 of FIG. 4;

FIG. 6 is a view similar to that of FIG. 3, showing a variation of the machine;

FIG. 7 is a fragmentary view of the variation shown in FIG. 6 on a larger scale;

FIGS. 8 and 9 are cross-sections of additional embodiments of the screw;

FIG. 10 is a cross-section indicating an optional phase of the process;

FIG. 11 is a cross-section of a cylindrical body having in its helical groove a soldering wire surrounded by the wire forming the screw; and FIG. 12 is an elevation of a mandrel carrying the wire in helical shape prior to its application on the cylindrical body.

Referring now to the drawings, the screw illustrated in FIG. 1 comprises a body 1 and an attached thread 2 constituted by a metal wire 3 of a circular section disposed in a helical groove 4 in the body I, which groove 4 is cut into the body 1 by means of a hob or cutter 1'.

The screw is made by means of a machine illustrated in FIGS. 2 and 3, which comprises a frame 5 provided with two parallel slides 6 along which a carriage 7 moves. The carriage 7 is moved by means of a lead screw 8 driven by the spindle of a lathe carrying a chuck 9, by using a gear train (not shown) disposed beneath a casing 10.

The body 1 of the screw to be produced is disposed between the chuck 9 and a conventional tail-stock 11, which body 1 has a helical groove 4 cut therein, as set forth above (FIG. 1), and a wire 3, which is delivered from a reel 12 of a drum 13, the latter being mounted on the carriage 7.

A rolling device 14 is disposed in front of the reel 12 on the frame of the drum 13, the wire 3 to be wound passing through the rolling device 14 and guiding the wire 3. For appropriate speeds and directions of rotation of the chuck 9 and of the lead screw 8, the wire 3, passing in the first instance through the rolling device 14, will thus be wound progressively on the body 1 in the helical groove 4 intended to receive it.

According to the process of the present invention, the wire 3, before being wound on the body 1 of the screw, is subjected to a treatment which tends to elongate it more on its side which is to be situated on the outside of the screw than on the opposite or inner side thereof.

In the machine illustrated, this rolling is effected by the rolling device 14, which comprises a main roller 15 of relatively large diameter on which the inside of the wire 3 bears and two pressure rollers 16 of smaller diameter, each carried by a slide 17, which acts on the outside of the wire 3.

The roller 15 has a groove 18 of semi-circular cross-section in which the wire 3 bears and each of the rollers 16 has a groove 19 in the form of an inverted V which caps the wire 3 as shown in FIGS. 4 and 5. The two rollers 16 may have slightly different profiles in order to have a progressive action on the wire 3.

The slides 17 are pushed in the direction of the roller 15 by means of screws 17', so that the rollers 16 exert a marked pressure on the wire 3 which is rolled as it passes between the rollers 16 and the roller 15.

As a result of the V profile of the rollers 16, two slight flat portions 20 are formed on the sides of the wire (FIG. 5).

As shown in FIG. 4, the radius "r" of the rollers 16 is smaller than the radius "R" of the roller 15, so that the rolling thus carried out tends to elongate the wire 3 in a more marked manner on its outside 22 than on its inside 23 (FIG. 4).

The effect of this rolling operation is to produce compression stresses in the portion "A" hatched vertically (FIG. 5) of the cross-section of the wire 3, that is to say beneath the flanks 20 formed on the latter, which are intended to serve as a bearing surface for an element cooperating with the screw.

The inside zone "B" of the cross-section of the wire 3, which is horizontally hatched, will on the other hand be the site of traction tension, and the same applies possibly to a very small zone "C" situated right on the outside of the wire 3 (FIG. 5).

The rolling step will be carried out in such manner that the compression stresses produced in the portion "A" of the cross-section of the wire 3 are of such value that, once the wire 3 has been wound on the body 1 of the screw, the portion of the wire 3 projecting from the body 1 of the screw remains, in the major part at least of its section, the site of compression stresses, which have the effect of improving the tenacity of the flanks 20 of the thread.

Shortly after it is wound on the body 1 of the screw, the wire 3 passes beneath a pressure roller 24 mounted on an adjustable slide 26. The effect of the roller 24 is to apply the wire 3 into the groove 4 in the body 1 of the screw. The regulation of its radial position enables the diameter of the completed screw to be modified somewhat, the wire 3, which is very hard and of a relatively small diameter, being embedded to a greater or lesser degree in the body 1 of the screw. A follower rest 27 disposed opposite the roller 24 beneath the screw supports the latter and prevents it from bending. The roller 24 also ensures that the wire 3 is polished.

For reasons of economy, the body 1 of the screw will, for example, be of an ordinary semi-hard steel, such as one or the other of the steels A and B in the following Table I:

TABLE I

| Steel | Composition by weight in addition to iron | Characteristics in the annealed state | | |
|---|---|---|---|---|
| | | R kg per square mm | E kg per square mm | A% |
| A | C 0.45<br>Si≤0.4<br>Mn≤0.7 | 56 to 74 | 38 to 45 | 18 to 22 |
| B | C 0.35<br>Si≤0.40<br>Mn 0.75<br>Ni 1.40<br>Cr 0.90 | ≥72 | 40 to 50 | 15 to 20 |

These steels in the body 1 of the screw will be in the hardened and tempered state. Before the machining of the groove 4 these steels will have undergone one of the treatments indicated in the following Table II:

TABLE II

| Steel | Treatment | Characteristics after treatment | | |
|---|---|---|---|---|
| | | R kg per square mm | E kg per square mm | A% |
| A | Water hardening at 800° C followed by tempering at 600° C | 95-110 | 75-85 | 12-8 |
| B | Oil hardening at 820° C followed by tempering at 550° C | 110-135 | ≥100 | ≥9 |
| | Oil hardening at 820° C followed by tempering at 200° C | 170-190 | ≥140 | ≥5 |

The body 1 of the screw could also be hardened by electric high-frequency treatment, as shown by example in FIG. 1, in which an electric high-frequency device 1² is shown schematically.

With regard to the drawn wire 3 constituting the thread it will be of a metal or alloy having high strength and hardness qualities.

It will also be possible for example to use special alloys such as those composed of 20 to 22% of molybdenum and, for the rest, pure iron, which change their structure without hardening on heating to 1200° C. approximately followed by a hardening and the hardness of which becomes considerable (500 to 600 Brinell), following upon tempering at much lower temperature (about 600° C.) during which the material tends to resume its original structure, internal stresses being produced.

Equivalent results may be obtained with alloyed steels containing approximately 18% of chromium and 8% of nickel, which have a hardness of as much as 400 to 500 Brinell simply by rolling. A slight annealing, carried out at about 400° C., may even bring their hardness to about 600 Brinell.

Finally, it is also possible to use wires of the "piano wire" type, wires of manganese steel of the "Hadfield" type, or wires of a special steel containing 15% of chromium and 12% of manganese. Manganese steels of the "Hadfield" type together with this latter steel harden following upon rolling and slight annealing in the same way as the steel containing 18% of chromium and 8% of nickel already mentioned.

In the screw illustrated in FIG. 1, the groove 4 has a semicircular cross-section, which is difficult to make with precision. To obviate this drawback, the groove 4 may be given, by example, a polygonal profile of the kind illustrated in FIG. 8.

It is also possible to give the groove 4 a profile of a general semi-circular shape, the base of which is, however, relieved as shown at 28 in FIG. 9 over an angle "S" extending for a range between 20° and 60°. This relieved part 28 ensures, on the one hand, that the wire 3 is applied properly against the sides of the groove 4 and provides, on the other hand, a space for the joint, which occurs when the wire 3 is brazed.

To improve the strength of the screw, it is also possible to subject it to an additional treatment comprising the steps of subjecting the body 1 of the screw between the threads to a rolling process in order to drive the material of the body 1 beneath the wire 3 wound on the latter.

As illustrated in FIG. 10, this operation may be carried out by means of a pressure roller 29 having a slightly curved profile adapted to roll over the helical zone 30 of the body 1 of the screw contained between two adjacent threads in order to drive the material beneath the latter.

For this operation, use may be made of the machine illustrated in FIGS. 2 and 3, either by mounting the roller 29 instead of the roller 24, to effect this operation during a new passage of the carriage or by providing a second support for the roller 29, which operates at the same time as the roller 24, one or two turns after the latter in the direction of movement of the body 1.

This compacting operation may naturally be carried out in a plurality of passes and may also be effected after a certain time of use of the screw, in order to compensate for the play due to the beating down of the metal and the wear which may have occurred. This operation may be repeated a number of times followed by a slight grinding operation to restore the desired surface quality of the thread. The life of the screw can thus be extended and attain a multiple of that of a screw having a thread cut from the actual body of the screw.

Finally, it is pointed out, that the wire 3 may also be soldered or brazed in the helical groove 4 by means of a soldering iron 14', shown schematically and that this fastening could be effected directly on the machine used for winding the wire 3, as illustrated in FIGS. 2 and 3, the machine being completed by an additional drum (not shown) enabling a soldering wire 3' to be unwound under the wire 3 and, for example, by electronic heating means $14^2$ to heat the wire 3' just before its point of winding (FIG. 11).

The soldering operation may be effected with tin, for example, by means of a mixture of tin containing 50% of tin and 50% of lead, the melting point of which is approximately 220° C. or by means of a silver hard-solder containing 53% of silver and the melting point of which is 530° C.

If necessary, heating of the wire 3 may be carried out in such manner that the soldering and annealing or other heat treatment for the wire is simultaneously ensured. To this end, it is possible in particular to provide on the machine a nozzle or any other means enabling a hardening liquid to be directed onto the wire at the point where it is soldered.

In another embodiment of the present method, the wire 3 may also be treated by a hammering operation carried out on the outside thereof.

This hammering operation may be effected on a variation of the machine illustrated by means of a hammering device 32 mounted on the carriage 7 instead of the rolling device 14 (FIG. 6).

The hammering device 32 comprises a fixed anvil 33 and a movable head 34 given a reciprocating motion by a toggle-joint mechanism 35 driven by an electric motor 35'. The anvil has a seat 36 of a semi-circular cross-section into which the wire 3 fits and the movable head 34 carries a profiled die 37 in the shape of a V, which acts in the same way as the rollers 16 of the rolling device 14 (FIG. 7).

In a variation, the hammering device could comprise two movable heads inclined in relation to one another and intended each to form one of the flat portions of the wire 3.

It is to be uderstood that the hammering of the wire 3 could also be effected in a plurality of successive passes by means of a plurality of dies of different profiles disposed one after the other.

In another variation of the present process, it is also possible to wind the wire 3 not directly on the body of the screw but on a mandrel 1° or on any other receiving device on which the wire $3^a$ will form a helical element of a diameter slightly greater than the diameter of the body 1 of the screw.

The helical element thus formed will then be threaded onto the body 1 of the screw, and then the wire 3 will gradually be applied into the groove 4, during a new rolling operation carried out, for example, on the machine illustrated, by means of the pressure roller 24, the helical element having previously been fixed by one of its ends to the body of the screw by a soldered point or in some other manner.

The wire 3 could also be applied to the groove following upon a new hammering operation.

The wire 3 placed in the groove 4 may be fixed to the body 1 of the screw by electrical soldering points disposed here and there along the wire at a relatively great distance from one another. The fact that the wire 3 is annealed at the soldering points will not give any disadvantage, since the threaded rollers which have to cooperate with the screw bear on numerous threads of the latter.

Finally, it will be pointed out that a precision heat treatment of the wire 3 can be carried out before it is put into place on the body 1 of the screw. Treatment of the isolated wire 3 which can be carried out before or after its preliminary winding is the only way of obtaining precise and regular results.

This heat treatment will, for example, comprise isothermal hardening. To this end, the wire is heated to its austenisation temperature, and then hardened in a salt bath from 300 to 400° C. according to the composition of the steel and the hardness required. It is kept at this temperature until its complete conversion, that is to say for a period of up to an hour, and then it is cooled in air.

While I have disclosed several embodiments of the present invention, it is to be understood that these embodiments are given by example only and not in a limiting sense, the scope of the present invention being determined by the objects and the claims.

I claim:

1. A method of fabricating a driving screw, comprising the steps of forming at least one helical groove in a cylindrical body, treating a wire to develop residual compression stresses in part of the cross-setion thereof, and securing such wire in said body groove with such part of the wire cross section outermost.

2. The method, as set forth in claim 1, including the steps of rolling the wire to cause differential elongation on opposite sides of the cross section thereof and securing such wire in said body groove with that part of its cross section which has undergone the greater elongation by rolling outermost.

3. The method, as set forth in claim 1, including the step of hammering the wire to develop said residual compression stresses in part of the wire cross section.

4. The method, as set forth in claim 1, including the step of rolling said body between the groove helix turns, following securement of the wire in the groove, to flow and compact the body material under the wire.

5. The method, as set forth in claim 1, including the step of soldering the wire in position in the groove.

6. The method, as set forth in claim 1, including the step of heating said wire while applying it to said body thereby to effect heat treatment of the wire material.

7. The method, as set forth in claim 1, including the steps of heating said wire and winding same, while hot, together with a filament of solder into said body groove thereby to effect heat treatment of the wire material and fusion of the solder for securing the wire in the body groove.

8. The method, as set forth in claim 1, including the step of forming said wire into a helix of greater diameter than said body and thereafter inserting the body within said helix and progressively deforming the wire into the body groove.

9. A driving screw comprising a body having a helical groove therein and a wire secured in said groove, said wire being formed of material having residual internal compression stresses in that part of its cross section that is outermost with respect to said groove.

10. The driving screw, as set forth in claim 9, in which said wire is secured in the groove by solder.

11. The driving screw, as set forth in claim 9, in which said body groove has a polygonal cross section.

12. The driving screw, as set forth in claim 9, in which said body groove and said wire have cross sections providing clearance between the wire and the base of the groove.

References Cited in the file of this patent

UNITED STATES PATENTS

| | | |
|---|---|---|
| 1,181,971 | Lovell | May 2, 1916 |
| 1,437,009 | Perkins et al. | Nov. 28, 1922 |
| 2,409,993 | Stupakoff | Oct. 22, 1946 |